Nov. 27, 1951　　　　C. I. HALL　　　　2,576,681
STARTING RELAY CONTROL FOR SINGLE PHASE MOTORS
Filed Jan. 15, 1948
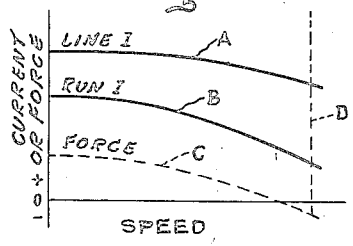
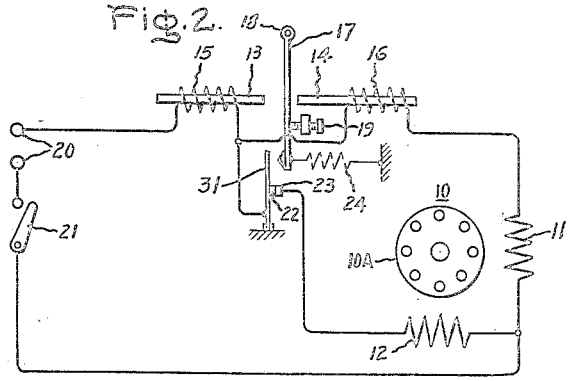
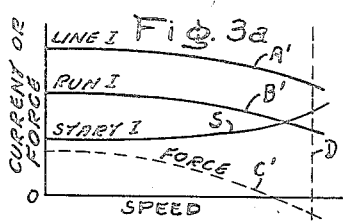
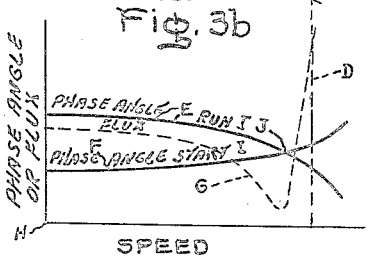
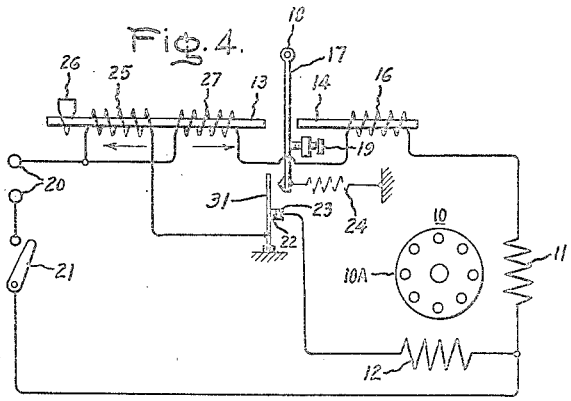
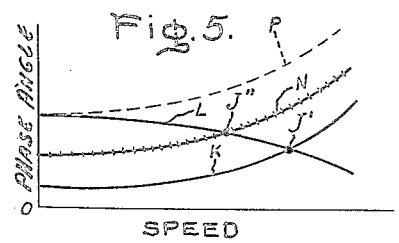
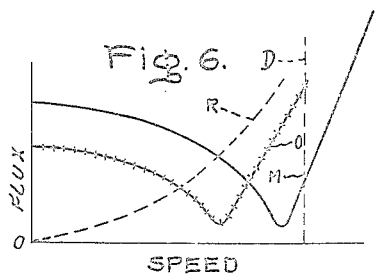
Inventor:
Chester I. Hall,
by
His Attorney Patented Nov. 27, 1951

2,576,681

UNITED STATES PATENT OFFICE 2,576,681

STARTING RELAY CONTROL FOR SINGLE-PHASE MOTORS

Chester I. Hall, Vischer's Ferry, N. Y., assignor to General Electric Company, a corporation of New York Application January 15, 1948, Serial No. 2,376

13 Claims. (Cl. 318—221)

1

This invention relates to control devices, and more particularly to control devices for starting an electric motor of the split phase type.

A split phase motor, as well known, is provided with running and starting windings, the starting winding usually being energized only to start the motor. After the motor is started, the starting winding is deenergized.

One method heretofore used to accomplish the above action is to connect a normally open starting relay in series with the running winding of the motor. When a circuit is closed through the motor and sufficient current passes through the relay, the starting relay closes its contacts to place the starting winding across the supply line to start the motor. When the motor comes up to speed the current through the running winding decreases and the relay contacts return to normally open position, thus deenergizing the starting winding. This method is not readily applicable to some motors, such as are used in connection with refrigerators, in which the reduction of run winding current with speed is too small to provide reliable operation. In addition, for larger capacity motors, the normally open contacts of such a relay which first close and almost immediately open cause welding, making the use of normally closed start contacts of great importance.

It is, therefore, an object of the present invention to provide a new and improved control device which places the starting winding across the supply line in the stalled or standstill condition of the motor.

Another object is to provide such a device capable of starting substantially all types of specially designed split-phase motors.

Still another object is to provide a control device capable of controlling split phase motors irrespective of line voltage variations.

Another object is to provide a new and improved control system embodying the device of the present invention.

In the present invention means are provided for the utilization of the difference in relative rates of change of the supply line current and the running winding current. This is accomplished by applying the opposing forces produced by separate magnet coils energized by said currents, to actuate an armature. As practiced by the present invention, there is provided a control device in which the starting contacts are closed in the stalled or standstill condition of the motor and then opened by the armature in response to said opposing forces, at a predetermined motor speed.

2

The various features of construction and arrangement of the invention are fully described hereinafter, and for a better understanding of the invention, reference is had to the accompanying drawing in which like reference numerals refer to like parts: Figs. 1, 3, 5 and 6 are graphical representations of certain single phase motor characteristics significant in the understanding of the invention, and Figs. 2 and 4 are partially schematic diagrams illustrating various motor starting systems and devices embodying the present invention.

Referring particularly to Fig. 1, there are illustrated two "current versus speed" curves typical of a resistor-start single-phase motor and a force curve which is the resultant of the fluxes produced by the current shown in said first-mentioned curves. Curve A represents the gradual drop in supply line current as the speed of the motor increases, while curve B is characteristic of the drop in current through a running winding of such a motor as the speed increases. Curve C shows the resultant force of the fluxes produced by the currents of curves A and B as they pull on a movable magnetizable armature which actuates a switch for disconnecting a starting winding in the above-mentioned motor, while a dotted line D is the desired speed at which tripping or opening of the switch takes place.

Attention is called to the disproportionate change in current between curves A and B. It is this difference in rate of change of supply line and running currents in the above type of motor which is the basis of one embodiment of the present invention, as will be presently explained.

In Fig. 2 there is shown a single-phase motor 10 having running and starting windings 11 and 12, respectively, the characteristics of which are similar to those described in connection with Fig. 1. The motor 10 is connected to be controlled by the improved control device of the present invention. The control device comprises a plurality of magnetic core members 13 and 14. Supported upon said core members 13 and 14, respectively, is a pair of magnet coils 15 and 16. The number of turns on the coils 15 and 16 are determined by the difference in rates of change of current, with respect to speed, in the starting and running windings of the motor. This is arranged so that, at the desired trip-out speed, the ampere turns of the coil 15 is sufficient to overcome the pull of the magnetized core 14 as the current through the running winding 11 of the motor decreases.

Responsive to the above-mentioned core members 13—14, when same are suitably magnetized is a movable armature 17. As shown in the schematic diagram the armature 17 is pivotally supported at a point 18. Other means of supporting the armature may be resorted to which will provide either slidable or pivotal movement thereof.

A predetermined air gap between the core member 14 and the armature 17 is maintained by an adjustable screw 19, the screw providing means for adjusting the air gap.

Means for energizing the running and starting windings 11—12 and the coils 15—16 are provided by a power supply circuit 20 which may be conected to any suitable source of alternating current supply (not shown). In series with one side of the circuit 20 and the starting winding 12 is a switch 21 for controlling the energization of the aforementioned components. The coil 15 is so connected to the motor that it is traversed by the currents in the running and starting windings 11—12, while the coil 16 is is traversed by the currents in the running winding only.

A pair of contacts 22—23 are provided to make or break the circuit of the starting winding 12 of the motor 10. Normally these contacts are closed and are caused to open under conditions which will be presently explained. The contact 22 is connected between the coils 15—16 and the cooperating contact 23 is connected to the other end of the starting winding 12. The contacts 22—23 are actuated by the armature 17 in response to the influence of the core members 13—14 as will be presently explained. A spring member 24 biases the armature 17 in the direction of the core member 14.

Having described in detail one embodiment of a control device made in accordance with the present invention, there follows the description of the operation of an electric system utilizing such a device.

First, bear in mind the characteristics of the motor, to which the above described system has been applied. As shown in the curves of Fig. 1, the supply line current in this type of motor falls off at a lower rate than the current in the running winding thereof. When the motor is deenergized the contacts 22—23 are maintained in closed relation due to the tension of the contact spring member 31. With the switch 21 open, the armature 17 is held against the air gap adjusting screw 19 by the biasing spring 24.

At the instant the switch 21 is closed, there exists, with respect to the motor 10, a so-called stalled or zero speed condition. At this instant the current from the supply circuit 20 will flow through the coils 15—16 and will set up magnetic forces in the core members 13—14. This produces a sufficient member of ampere turns at the small air gap between the armature 17 and the core member 14 to hold the armature in position against the screw 24. In this position the armature has no effect on the contacts 22—23 and they remain closed. With these contacts closed current will flow through them to energize the starting winding 12 thereby to produce the necessary revolving field, as is well known, to rotate the armature 10A of the motor 10.

As the speed of the motor 10 increases, the value of the flux produced in the core member 14 falls at a proportionately higher rate than does that of the core member 13. At a predetermined critical speed the pull on the armature 17 by the core member 13 overbalances that produced by the coil 16 on the core member 14 and the armature 17 instantly moves over toward the core member 13. At approximately half of its travel toward the core member 13, the armature 17 urges the contacts 22—23 open and so deenergizes the starting winding 12. As a result the coil 15 has flowing through it only the current in the running winding 11. However, since the air gap between the armature 17 and the core 13 is now very small, the magnetic force produced by this reduced member of ampere turns is still sufficiently large enough to hold the armature 17 in the run or motor operating position, while maintaining the contacts 22—23 open.

Opening the switch 21 deenergizes the supply line circuit 20 and causes the armature 17, in response to the biasing spring 24, to instantly move back to its position against the screw 19. As a result, the contacts 22—23 are again closed and the starting winding 12 is again placed across the supply line circuit 20. Within reasonable limits, the air gap between the armature 17 and the core member 14 are adjustable to select different speeds at which the starting winding is disconnected from the motor.

Fig. 3a illustrates graphically a set of curves of a single phase motor, either resistor or capacitor start, in which the change in the line current (curve A') and the change in the running winding current (curve B') do not vary substantially in ratio as the speed of the motor increases, that is, the current in the line and in the winding fall off at substantially the same rate. In such motors the current through the start winding usually rises as the motor speed increases, as shown in curve S, and the circuit modification illustrated in Fig. 4 is applicable. With this modification the conditions previously described in connection with Figs. 1 and 2 are simulated and the fluxes produced by the currents through the windings on core members 13 and 14, Fig. 4, produce a resultant pull on armature 17, Fig. 4, as shown by curve C' of Fig. 3a.

The curves shown in Fig. 3b have the following significance. The curves E and F represent respectively, the change in the phase angles of the currents in the running and starting windings with respect to the line voltage as the motor speed changes. In a preferred embodiment of my invention, at zero motor speed, phase displacement of the current in the run winding (curve E) is approximately 45° from the phase angle of the current in the start winding (curve F). As the motor speed increases, this phase displacement decreases until the currents in the start and run windings are in phase with each other at point J on the curves, and then a rapid phase displacement between the currents takes place. The curve G represents the resultant flux formed on core member 13 by the opositely wound coils thereon (see Fig. 4) in which there are both current magnitude changes as shown Fig. 3a and changes in the relative phase angles of the currents as shown in Fig. 3b. In order to achieve a non-linear variation of the respective fluxes about the core members 13 and 14 with changes in motor speed, to obtain an operating condition such as described in connection with Fig. 2, the magnetic coils on the core member 13 (see Fig. 4) are arranged to set up opposing fluxes in accordance with the variations of the magnitude of the currents and the phase angles of the currents through the running and starting windings.

It should be noted that the point J, the point of phase angle coincidence of running and starting currents, occurs at a speed less than the desired trip out speed which is shown by dotted line D; and that point J represents both the point of coincidence of the phase angles of the currents through the running and starting windings and also the point of coincidence of phase angles of the fluxes produced by the coils about core member 13 (Fig. 4).

Since the currents through the running and starting windings are in phase coincidence at the point J on the curves E—F, at this point the resultant flux is substantially zero assuming that at this same time the ampere turns of coils 25 and 27 are also substantially equal. Now as the speed of the motor increases, the phase angle between the curves E—F increases very rapidly and the currents through the running and starting windings also change rapidly as shown by curves B' and S. As a result, the flux available (curve G) increases at a very rapid rate, thereby to cause the starting winding 12 to be deenergized as will be presently explained. So it can be seen that the effective magnetization of core member 13 (curve G) is dependent upon the changes of magnitude of the current in the run and start windings (Fig. 3a) as well as the phase angles of the currents in these windings (Fig. 3b).

In order to start a motor designed so that the line current and the current through the running winding drop proportionate amounts as the motor speed increases, an alternative embodiment of the present invention will now be described in connection with Fig. 4.

In this particular embodiment there is supported on the core 13 a coil 25 for producing a flux proportional to the current through the starting winding 12 and a coil 27 for producing a flux proportional to the current through the running winding 11. The combination of these two fluxes produces the resultant flux illustrated by curve G. The coil 16 is supported on the core member 14 in the same manner as hereinbefore described. In this particular embodiment the coils 16 and 27 are connected in series with the supply circuit 20 and the running winding 11 and back to the switch 21. The coil 25 is connected in series with the supply circuit 20, through the contacts 22—23, the starting winding 12 and back to the switch 21. The starting current responsive coil 25 and the running current responsive coil 27 are arranged so as to set up opposing magnetic forces in the core member 13. As will be presently explained, without this improved arrangement, the armature 17 would not be properly influenced by the core member 13.

The following will be a description of the operation of the second embodiment together with a system for utilizing the same.

At the instant the switch 21 is closed, all the coils 16, 25 and 27 will be energized. Since the running and starting windings 11—12 of the motor 10 are shifted in phase with respect to each other in order to provide the necessary revolving field for starting the motor, the coils 25 and 27 will also have the same out-of-phase relationship. At the stalled or zero speed condition of the motor there is produced a relatively high resultant flux (curve G). However, because of the relative airgap distances between the armature 17 and the respective core members 13 and 14, this flux will be insufficient to overcome the pull of the member 14 and the armature will remain in its position with respect to said member 14.

As the speed of the motor 10 increases, the magnetic effect of the core member 14 decreases slowly. The effect of the core member 13 also decreases but at a greater rate. Since the effect of the member 13 decreases at a more rapid rate than the member 14, the resultant flux (curve G) drops to substantially zero at which point there is zero phase difference between the fluxes produced by the starting current responsive coil 25 and the running current responsive coil 27.

After the resultant flux of the core member 13 passes through the zero phase coincidence just mentioned it increases very rapidly as shown by the steep angle of the curve G. At the desired trip speed (dotted line D), the resultant flux of the core member 13 will now be sufficient to overcome the effect of the relatively larger air gap between it and the armature 17 and will swing same into position adjacent the core member 13 thereby to cause the contacts 22—23 to open. With the contacts thus opened, the starting winding 11 will be disconnected.

Upon opening the switch 21, the motor circuit is deenergized causing the armature to assume its initial position adjacent the core member 14 and the contacts 22—23 to close. In the deenergized condition, the armature 14 responds to the bias produced by the spring member 24 to maintain said contacts closed.

In connection with the embodiments above described it will be recalled that the tripping out speed of the relay 17 was somewhat less than the running or operating speed of the motor. For example in those motors whose operating or running speed was of the order of 1750 revolutions per minute, the desired tripping out speed (the speed at which the starting winding is disconnected) is of the order of 1450 revolutions per minute. However, the tripping out speed must exceed the speed at which the phase angles of the fluxes produced responsive to the currents and phase angles of the currents through the running and starting windings become equal (point J of Fig. 3). In some of the more recently manufactured motors this speed (at which the phase angles become equal) is higher than the desired tripping out speed, and may reach the order of 1500 to 1525 revolutions per minute. It then becomes quite difficult to adjust the tripping out speed appreciably below 1575 to 1600 revolutions per minute which is a speed near the rated running speed of the motor. In case of a heavy load in such a motor, or a severe circuit disturbance, it is possible that the motor will not reach its running speed nor the speed at which the starting winding will trip out.

To insure that the starting winding will trip out after starting such motors, it is desirable to shift the point J to a lower motor speed. Point J is now being considered as the point at which the fluxes produced respectively by coils 25 and 27 in proportion to the currents through the running and starting windings are in phase coincidence. I have found that I can shift this point of flux phase angle coincidence, so that the point J occurs at a speed sufficiently lower than the desired trip out speed, by changing the phase angle displacement of the flux produced by the starting current responsive coil 25 with respect to the phase angle of the flux produced by the running current responsive coil 27. I do this by producing a first flux proportional to the current through the running current responsive coil 27 and a second separate flux proportional to the current through the starting current responsive coil 25. By means of a shading coil 26, I then cause a phase shift of the second flux before combining it with the first flux to form a resultant flux. By so changing only the phase angle of the flux produced by the starting current responsive coil 25, I can adjust the point at which the phase angle displacement of the fluxes produced by the running and starting current responsive coils are equal (point J) so that trip out can occur at the desired motor speed.

Figures 5 and 6 illustrate the effect of using the shading coil 26 on a starting relay for a motor so designed that the motor speed at which the phase angles of the currents in the running and starting windings are in coincidence is only a few R. P. M. from the running speed of the motor. Curves K—L of Figure 5 shows respectively the change in the phase angles of the fluxes produced by the running and starting current responsive coils, with respect to speed, of a motor having the speed characteristics mentioned above. These curves correspond to curves E and F of Fig. 3b. The resultant flux curve M shown in Fig. 6 corresponds to curve G of Fig. 3b and represents the effective magnetization of a core member, such as core member 13 (Fig. 4), which is dependent upon both the changes of magitude of current in the running and starting windings of a split phase motor and also upon the phase angle displacements of the currents through two opposing windings on the core itself. The dotted line D of Fig. 6 represents the motor speed at which it is desired that the start winding will be tripped out of the circuit. For motors having a normal running speed of 1750 R. P. M., this desired trip out speed is approximately 1450 R. P. M. Any attempt to operate the armature 17 at a speed below this value will mean that the armature 17 will trip out the start winding at the instant the motor is energized. This of course would not allow the start winding to provide the revolving field necessary to start the motor.

By producing separate fluxes responsive to the currents through the running and starting windings and by causing, as aforementioned, a phase shift of the flux produced by the starting current responsive coil with respect to the phase angle of the flux produced by the running current responsive coil, a different set of resultant flux curves O and R are obtained. This is accomplished by introducing a predetermined amount of shading in the magnetic circuit of the starting current responsive coil 25. Curve N shows how the inclusion of such shading shifts the phase angle of the start flux with respect to the start flux of curve K. It can now be observed that point J, the point at which the phase angles of the fluxes produced by coils 25 and 27 in response to the currents and phase angles of the currents through the run and start windings are in coincidence, has moved back to J' (where curve N crosses curve L) which shows that the point at which the phase angles of the fluxes produced by the coils 25 and 27 in response to the currents through the running and starting windings are in coincidence has been changed to a lower motor speed. The resultant flux curve O now represents the effective magnetization of a core member such as core member 13 (Fig. 4) in which the curves L and N represent the phase angle displacement of the fluxes in coils 25 and 27. This shows that the proper amount of flux can be obtained at the required motor speed that will permit the control device to be adjusted with a considerable margin of safety as far as the instantaneous tripping out feature is concerned and can be made to trip out at a lower speed than with the unshaded arrangement.

Carrying this idea to a reasonable limit and increasing the shading, a greater shift in the phase angle of the starting current responsive flux can be arranged as shown by the curve P. Here the phase angles of the starting and running current responsive fluxes, produced respectively by coils 25 and 27, are equal with respect to line voltage at zero speed; and, in a device where curves P and L represent the phase angle displacement of the fluxes in the coils 25 and 27, there is produced a resultant flux which is shown by curve R in which the flux produced at stalled or zero speed is essentially zero and rises rapidly as the motor accelerates. Thus, operation of armature 17 can be obtained at practically any desired speed. It has been assumed again in the discussion of Figs. 5 and 6, that, in each modification, at the speed of phase angle coincidence the ampere turns of starting current responsive coil 25 are substantially equal to the ampere turns of running current responsive coil 27.

Referring again to Fig. 4 the device of the present invention is modified to overcome the above-mentioned obstacle relative to tripping out speed by the inclusion of the short-circuited shading coil 26. With the exception of this change the device is similar in construction as hereinbefore described in connection with Fig. 4.

The core member 13 supports thereon, in inductive relation to the coil 25, the short circuited coil 26 whose purpose is to shift the phase of the flux in the coil 25 to produce the effects referred to above in connection with Figs. 5 and 6.

Electrically the system shown in Fig. 5 has the same operating sequence as described above in connection with the explanation of Fig. 4. However, as explained above, the introduction of the short circuited winding 26 or so-called shading means serves to shift the phase relation of the flux produced by the coil 25 to enable the selection of a much wider range of tripping out speeds for the motor 10.

In summarizing attention is called to the flexibility of the invention which enables same to be utilized with practically any type of split-phase motor and the ability thereof to provide means for selecting a wide range of tripping out (starting winding disconnect) speeds.

The embodiments of the present invention which have been illustrated and described have been selected for the purpose of setting forth the principles involved. It will be obvious that the invention may be modified to meet various conditions for different specific uses and it is intended to cover by the appended claims all such modifications which fall within the true spirit and scope of the present invention.

What I claim as new and desire to secure by Letters Patent of the United States is:

1. A starting relay for a single phase motor having starting and running windings and adapted for connection to a line carrying energizing current from a source of electrical potential comprising, switching means for normally connecting said starting winding in parallel circuit relationship with said running winding, first electromagnetic means for producing a flux proportional to the current through said running winding, second electromagnetic means for producing a second flux proportional to the currents through said running and starting windings, said fluxes varying non-linearly with respect to each other as the speed of said motor changes, and magnetizable means responsive to the variation of said fluxes with changes of said motor speed for actuating said switching means to disable said starting winding at a predetermined motor speed.

2. A starting relay for a single phase motor having starting and running windings in parallel circuit relationship adapted to be energized by a source of alternating current supply comprising, switching means including a pair of normally closed cooperating switch contacts in series circuit relationship with said starting winding, a pair of spaced apart magnetizable core members, a movable magnetizable armature arranged so that said members exert opposing attractive forces on said armature, first electromagnetic means for energizing said one core member in proportion to the current through said running winding, and second electromagnetic means for energizing said other core member in proportion to the currents through said starting winding and through said running winding, said first and second means energizing their respective core members to produce a resultant pull on said armature which will move said armature to open said switch contacts when the attractive force of said other member on said armature exceeds the attractive force of said one member by a predetermined value at a predetermined motor speed.

3. A starting relay for a single phase induction motor having starting and running windings in parallel circuit relationship adapted to be energized by an alternating current supply source comprising, switching means including a pair of normally closed cooperating switch contacts in series circuit relationship with said starting winding, a pair of spaced apart magnetizable core members, a pivoted magnetizable armature for actuating said switch contacts mounted for movement in response to the opposing attracting magnetic forces of said members, said armature being biased in closer relation to one of said core members than to the other thereby to form a narrow air gap with said one core member, first electromagnetic means responsive to the current through said running winding for energizing said one core member, the narrow air gap between said armature and said member producing a flux about said core member sufficient to hold said armature and prevent said armature from immediately opening said contacts, and second electromagnetic means responsive to the current in both said running winding and in said starting winding for energizing said other core member, the energization of said other core member, being too weak to attract said armature and open said contacts until the difference in the currents in said running winding and in said line as said motor speed winding reaches a predetermined value.

4. In a starting relay for an electric induction motor having starting and running windings and adapted for connection to a line carrying energizing current from a source of electrical potential, switching means for normally connecting said starting winding in parallel circuit relationship with said running winding, and electromagnetic means responsive to a difference in the currents in said line and in said running winding as said motor speed increases for actuating said switching means to disconnect said starting winding when said motor reaches a predetermined speed.

5. In a starting relay for an alternating current motor adapted for connection to an alternating current supply line and having a starting winding and a running winding, said motor having a starting characteristic such that the current in said running winding changes at a greater rate than the current in said supply line as the speed of said motor increases, switching means including a pair of normally closed cooperating switch contacts for connecting said starting winding in parallel circuit relationship with said running winding, first electromagnetic means responsive to the current in said supply line for opening said switch contacts to disconnect said starting winding, and second electromagnetic means responsive to the current in said running winding for opposing the action of said first electromagnetic means.

6. In a starting relay for a single phase motor adapted for connection to an alternating current supply line and having a starting and a running winding, said motor having a starting characteristic such that the current in said running winding changes at a greater rate than the current in said supply line as the speed of said motor increases, switching means including a pair of normally closed cooperating switch contacts for connecting said starting winding in parallel circuit relationship with said running winding, a movable magnetizable armature for actuating said contacts, said armature being biased to a predetermined position, first electromagnetic means responsive to the current through said running winding for attracting said armature, and second electromagnetic means responsive to the current through said line for oppositely attracting said armature, said first and second means producing a resultant pull on said armature proportional to said changing rates of current in said line and in said running winding which will move said armature against its bias and open said switch contacts at a predetermined motor speed.

7. In a starting relay for a single phase motor adapted for connection to an alternating current supply line and having a starting and a running winding in parallel circuit relationship, said motor having a starting characteristic such that the current in said running winding changes at a greater rate than the current in said current supply line as the speed of said motor increases, switching means including a pair of normally closed cooperating switch contacts in series circuit relationship with said starting winding, a magnetizable armature for actuating said switch contacts and biased to a predetermined position, first electromagnetic means responsive to the current through said running winding for attracting said armature when said motor is started and holding said armature in its predetermined position, and second electromagnetic means responsive to the current in said line for oppositely attracting said armature and at a predetermined motor speed moving said armature against its bias thereby to open said switch contacts, said second electromagnetic means overcoming the attraction of said first electromagnetic means at said predetermined motor speed due to said motor characteristic by which the current through said running winding changes at a faster rate than the current through said line as said motor speed increases to running speed after starting.

8. In a starting relay for a split phase induction motor adapted for connection to an alternating current supply line and having a starting and a running winding in parallel circuit relationship, said motor having a starting characteristic such that the current in said running winding decreases at a greater rate than the current in said current supply line as the speed of said motor increases, switching means including a pair of cooperating switch contacts for disabling said starting winding, a pair of spaced apart magnetizable core members, a pivoted magnetizable armature for actuating said contacts biased to a predetermined position and mounted for movement in response to the opposing attracting magnetic forces of said members, first electromagnetic means for energizing one of said core members in response to the current through said running winding, and second electromagnetic means for energizing the other said core member in response to the currents through said starting winding and through said running winding, said first and second means energizing their respective core members to produce a resultant pull on said armature responsive to said changing rates of decrease of current in said line and in said running winding thereby to move said armature against its bias and actuate said switch at a predetermined motor speed.

9. In a starting relay for a single phase motor having starting and running windings and adapted for connection to a line carrying energizing current from a source of electrical potential, said motor having a starting characteristic such that the currents in said line and in said running winding decay at substantially equal rates as said motor increases in speed, switching means including a pair of normally closed cooperating switch contacts for connecting said starting winding in parallel circuit relationship with said running winding, first magnetic means for producing a flux proportional to the current through said running winding, second magnetic means including a pair of oppositely wound coils for producing a second flux which is the resultant of the opposing fluxes produced separately by the currents through said running and starting windings, said first and resultant fluxes varying non-linearly with each other as the speed of said motor increases, and a movable magnetizable armature oppositely attracted by said first and resultant fluxes, said armature moving in response to the varying opposing pulls of said first and resultant fluxes as said motor speed increases so that said switch contacts are opened at a predetermined motor speed.

10. In a starting relay for a split phase induction motor having starting and running windings in parallel circuit relationship and adapted for connection to a line carrying energizing current from a source of electrical potential, said motor having a starting characteristic such that the currents in said line and in said running winding decay at substantially equal rates as said motor increases in speed, a movable armature biased in a predetermined position, a first and a second magnetic core member arranged to exert opposing forces upon said armature thereby to attract said armature towards one or the other of said core members, first electromagnetic means including a single coil for producing a first flux proportional to the current through said running winding to energize said first core member, second electromagnetic means for producing a resultant flux to energize said second core member, said second means including a pair of oppositely wound coils one of which is in series circuit relationship with said single coil, said one coil of said pair of coils producing a second flux in accordance with the current through said running winding and the other coil of said pair of coils producing a third flux in accordance with the current through said starting winding, said second and third fluxes being in opposition and interacting to form said resultant flux which flux varies non-linearly with respect to said first flux as said motor speed changes, and switching means including a pair of normally closed cooperating switch contacts in series circuit relationship with said starting winding and adapted to be opened by said armature, said armature moving against its bias to open said switch contacts when the attractive force of said second member exceeds the attractive force of said first member at a predetermined motor speed.

11. In a starting relay for a single phase alternating current motor having starting and running windings and adapted for connection to a line carrying current from a source of electrical potential, said motor having a starting characteristic such that phase angle coincidence of the currents and fluxes produced by said currents through said starting and running windings occurs at a speed only slightly below normal operating speed, switching means for normally connecting said starting winding in parallel circuit relationship with said running winding, first electromagnetic means for producing a first flux proportional to the current through said running winding, second electromagnetic means for producing a resultant flux; said second means including a pair of oppositely wound coils one of which produces a second flux in accordance with the magnitude and the phase angle of the current in said running winding and the other of which produces a third flux in accordance with the magnitude and the phase angle of the current in said starting winding, said second and third fluxes being in opposition and interacting to form said resultant flux which varies non-linearly with respect to said first flux with changes of speed of said motor, magnetizable means responsive to said variation in said first and resultant fluxes for actuating said switching means to disconnect said starting winding at a predetermined motor speed above the speed at which said phase angle coincidence occurs, and means associated with said second means for modifying the phase angle displacement of the flux produced by one of said pair of coils with respect to the phase angle of the flux produced by the other of said pair of coils thereby to change the motor speed at which phase angle coincidence of the fluxes produced by each of said pair of coils occurs.

12. In a starting relay for a single phase alternating current motor having starting and running windings and adapted for connection to a line carrying current from a source of electrical potential, said motor having a starting characteristic such that phase angle coincidence of the currents and fluxes produced by said currents through said starting and running windings occurs at a speed only slightly below normal operating speed, switching means including a pair of normally closed cooperating switch contacts for connecting said starting winding in parallel circuit relationship with said running winding, first magnetic means for producing a first flux proportional to the current through said running winding, second magnetic means including a pair of oppositely wound coils one of which produces a second flux in accordance with the magnitude and the phase angle of the current through said running winding and the other of which produces a third flux in accordance with the magnitude and the phase angle of the current through said starting winding, said second and third fluxes being in opposition and interacting to produce a resultant flux which varies non-linearly with respect to said first flux with changes of speed of said motor, a short circuited coil associated with said second means for controlling the phase angle displacement of the flux produced by one of said pair of coils with respect to the phase angle of the flux produced by the other of said pair of coils thereby to reduce the motor speed at which phase angle coincidence of the fluxes produced by each of said pair of coils ocurs, and a movable magnetizable armature oppositely attracted by said first and resultant fluxes for actuating said switch contacts to disconnect said starting winding, said armature moving in response to the varying opposite pulls of said last-mentioned fluxes as said motor speed increases so that said switch contacts are opened at a predetermined motor speed above said reduced speed at which phase angle coincidence occurs.

13. In a starting relay for a single phase motor having starting and running windings in parallel circuit relationship adapted to be energized from an electric current supply circuit, said motor having a starting characteristic such that the speed at which the phase angles of the respective currents and fluxes produced by said currents through said windings are in coincidence is very close to the running speed of the motor, a pivoted armature biased in a predetermined position, a pair of magnetic core members arranged to exert opposing attracting forces on said armature thereby to attract said armature towards one or the other of said members first electromagnetic means including a coil for producing a first flux proportional to the current through said running winding to energize one of said core members, second electromagnetic means including a plurality of coils for producing a resultant flux to energize the other of said core members, said first and resultant fluxes varying non-linearly with respect to each other with changes of speed of said motor, said plurality of coils including one coil which produces a second flux in accordance with the magnitude and the phase angle of the current through said starting winding, another coil wound in opposition to said one coil and which produces a third flux in accordance with the magnitude and the phase angle of the current through said running winding, and still another coil associated with said one coil and which is electrically short circuited thereby to vary the phase angle displacement of said second flux with respect to the phase angle of said third flux and thereby reduce the motor speed at which the respective phase angles of said second and third fluxes are in coincidence, and normally closed switching means connected to disable said starting winding and adapted its bias in response to the varying opposite pulls of said first and resultant fluxes as said motor speed increases so that said switching means are actuated at a predetermined motor speed in excess of the reduced motor speed at which the phase angles of the currents in said starting and running windings are coincident.

CHESTER I. HALL.

REFERENCES CITED

The following references are of record in the file of this patent:

UNITED STATES PATENTS

| Number | Name | Date |
|---|---|---|
| 1,921,127 | Hutt | Aug. 8, 1933 |
| 2,021,199 | Pearce | Nov. 19, 1935 |
| 2,235,537 | Schaefer | Mar. 18, 1941 |
| 2,262,417 | Wolfert | Nov. 11, 1941 |
| 2,459,615 | Buchanan | Jan. 18, 1949 |

FOREIGN PATENTS

| Number | Country | Date |
|---|---|---|
| 845,757 | France | May 22, 1939 |